July 24, 1923.
C. E. NORTON
AUTOMOBILE BRAKE
Filed Jan. 23, 1922
1,462,918
2 Sheets-Sheet 1
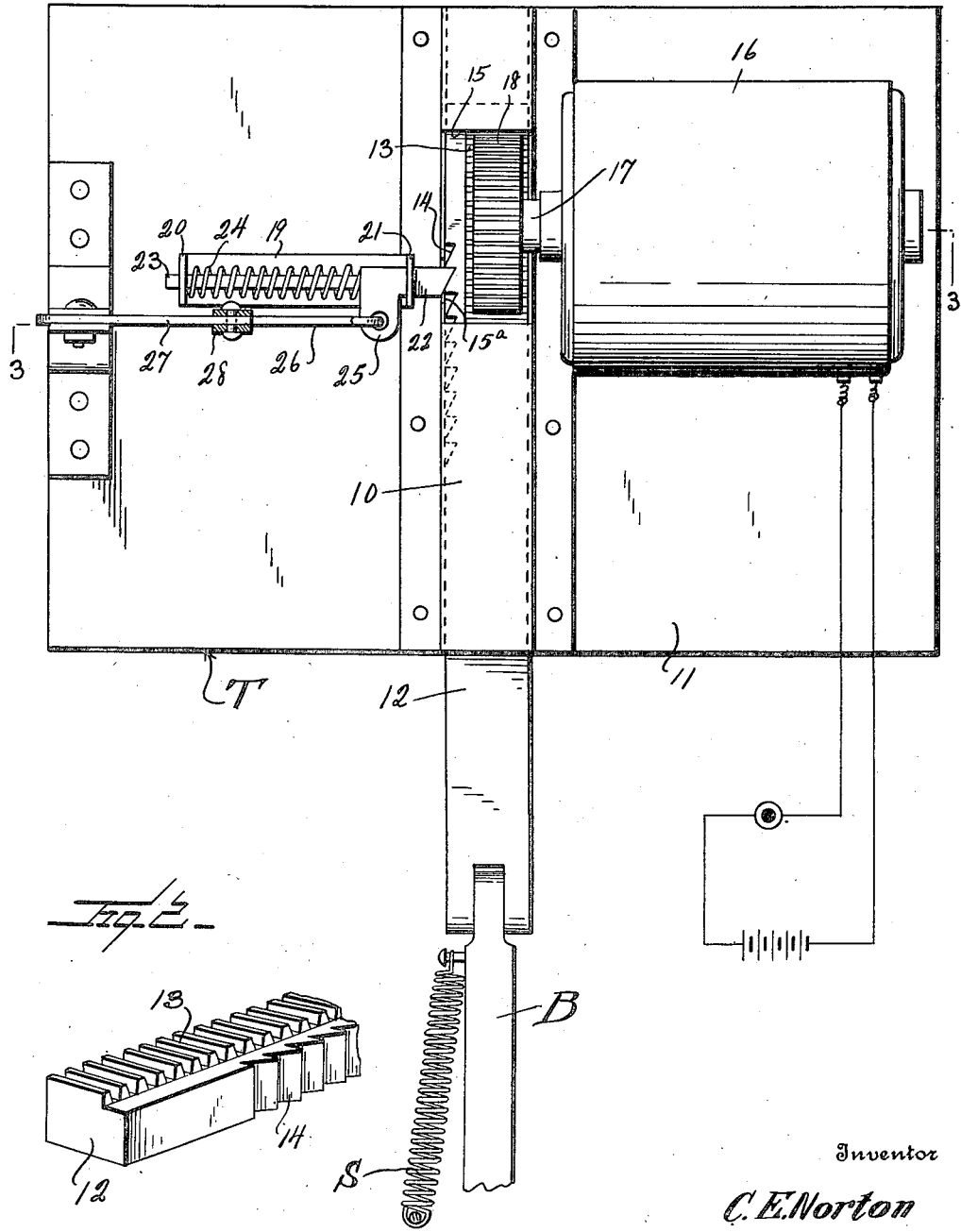
Inventor
C. E. Norton
By Watson E. Coleman
Attorney

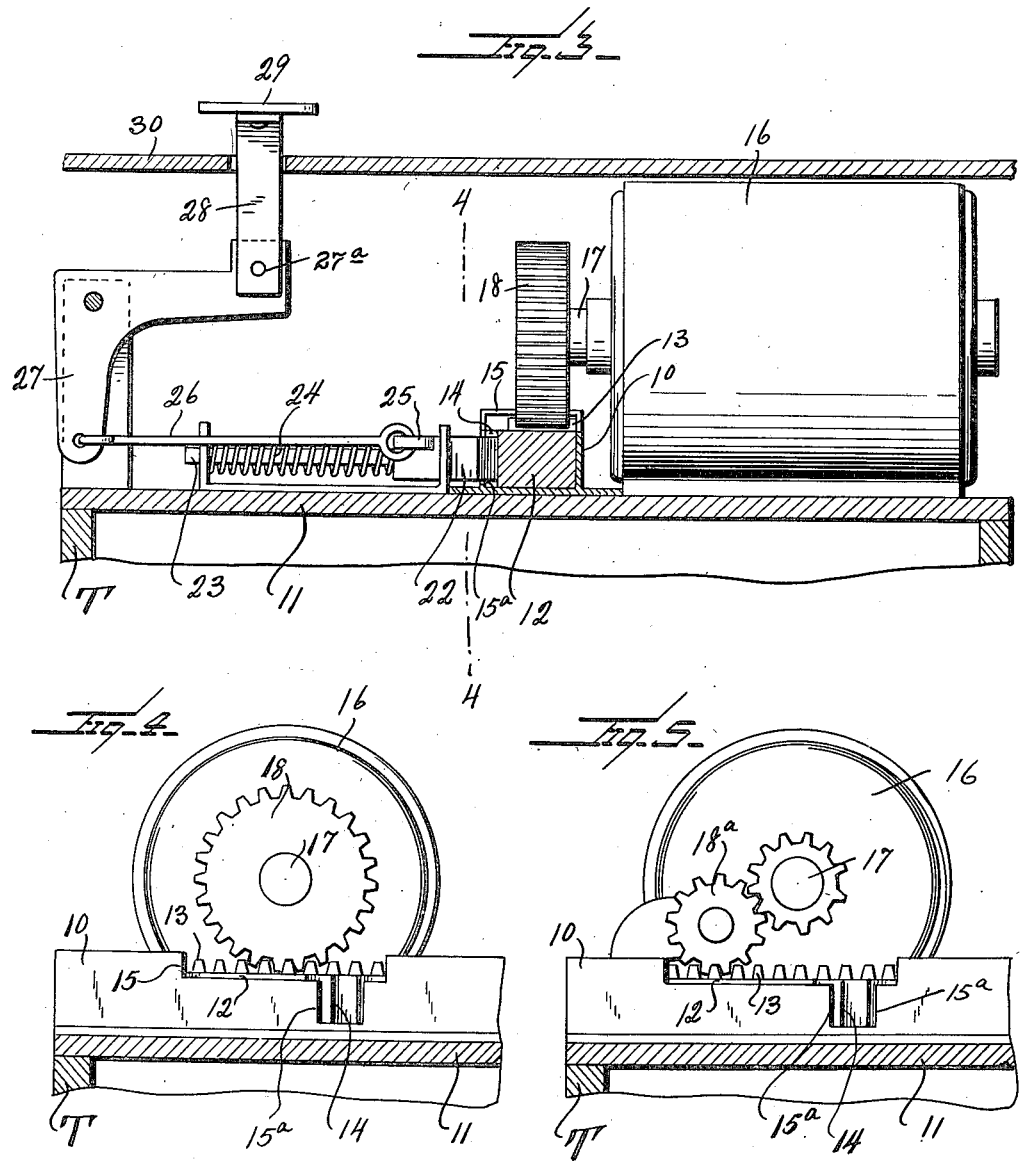

Patented July 24, 1923.

1,462,918

UNITED STATES PATENT OFFICE.

CHARLES E. NORTON, OF LOVELAND, COLORADO, ASSIGNOR OF ONE-HALF TO HARRY F. NORTON, OF LOVELAND, COLORADO.

AUTOMOBILE BRAKE.

Application filed January 23, 1922. Serial No. 531,256.

*To all whom it may concern:*

Be it known that I, CHARLES E. NORTON, a citizen of the United States, residing at Loveland, in the county of Larimer and State of Colorado, have invented certain new and useful Improvements in Automobile Brakes, of which the following is a specification, reference being had to the accompanying drawings.

This invention relates to automobile brakes and has for an important object thereof the provision of an electrically controlled brake.

A further object of the invention is to provide a device of the above character in which the brake is applied electrically and released manually. As is well known to those familiar with the art emergency brake controls, such as usually employed, are so located as to necessitate the operator of the car removing one hand from the steering wheel. Furthermore, in reaching for these controls it is necessary for the driver to keep his eyes to the front to be certain of avoiding an accident and accordingly the emergency brake control is often missed by the hand delaying the stopping of the car and sometimes resulting in accidents. In the provision of an electrical control for the brake it becomes possible to place the operating switch upon the steering wheel of the car, thus eliminating the necessity of removing the hands from the steering wheel, and so placing likewise eliminates the necessity for fumbling for the control levers.

A further object of the invention is to provide a device of this character which may be readily applied to the standard makes of cars.

Other objects and advantages of the invention will become apparent throughout the course of the following description.

In the accompanying drawings wherein for the purpose of illustration is shown a preferred embodiment of my invention and wherein like reference characters designate like parts throughout:—

Figure 1 is a plan view of a brake operating mechanism constructed in accordance with my invention;

Figure 2 is a perspective portion of the operating bar;

Figure 3 is a side elevation of the operating mechanism, parts being shown in section;

Figure 4 is a section on the line 4—4 of Figure 3; and

Figure 5 is a view similar to that shown in Figure 4 but embodying a slightly modified structure.

Referring now more particularly to the drawings, the character T designates the transmission case of an automobile which I preferably employ as a mounting for the brake operating mechanism. In accordance with my invention I place upon the cover 11 of the transmission a housing 10 in which is slidably mounted an operating bar 12.

The operating bar 12 is provided upon the upper face thereof with a gear rack 13 and upon the side face thereof with a ratchet rack 14. The housing 10 has formed in the upper surface thereof an opening 15. I likewise mount upon the transmission cover 11 a motor 16, the armature shaft 17 of which has secured thereto a gear 18 meshing with the rack 13 of the operating bar 12 through the opening 15 of the housing 10. It will, of course, be understood that in some instances it may not be desirable that the armature shaft of the motor 16 be geared directly to the rack 13 and in such cases a gear train $18^a$ may be employed between the motor and the rack to reduce the speed of application of the brakes. The housing 10 has likewise formed in the side wall thereof an opening $15^a$ exposing the ratchet rack 14. A plate 19 is provided, adapted to be secured upon the transmission cover 11 or at any other desired point, having at its ends ears 20 and 21 which slidably receive a bolt 22 engaging the ratchet rack 14 through the opening $15^a$.

Intermediate the ears the bolt 22 is reduced, as at 23, and this reduced portion is surrounded by a spring 24 forcing the bolt into engagement with the rack. This spring operates intermediate an enlargement 25 formed on the bolt and the ear 20 of the plate 19. The enlargement 25 likewise serves to limit the forward movement of the bolt 22.

The extension 25 is connected through the medium of a link 26 to one arm of a pivoted bell crank lever 27, to the other arm of which is pivotally connected as at $27^a$ a pedal stud 28 of a pedal 29 operating through the floor boards 30 of the car. The motor 16 will be connected in series with the storage battery of the car and a push button or any other suitable switch control which, as hereinbefore stated, may be located upon the steering wheel or whatever the driver may regard as the most accessible point of the machine. The operating bar 12 is connected to the brake rod B, the brake rod being provided with the usual spring return normally holding the same so that the brakes are in the inoperative position. When the switch is closed completing the circuit, the motor causes the operating rod to be drawn forwardly carrying therewith the brake rod B and when the rod is tightened it will be held in this position by the engagement of the bolt 22 and the rack 14 and may be left in such engaged position until its release is desired, no strain being placed upon the motor. When it is desired to release the same the depression of the foot pedal 29 will withdraw the bolt 22 and permit the spring return S of the brake rod to draw the operating rod rearwardly.

From the foregoing description it is believed to be obvious that a device constructed in accordance with my invention is particularly well adapted for the use for which it is intended by reason of the fact that it simplifies the operation of applying the brakes of a car and places the control of the brakes within the province of a person too weak to handle the manual type. It will furthermore be obvious that many changes are possible in the construction hereinbefore set forth without in any manner departing from the spirit of my invention or the scope of the sub-joined claim.

What I claim is:

In a brake operating mechanism, a brake rod, means normally urging the brake rod in one direction, means for moving the brake rod in the opposite direction including a bar provided with a ratchet rack, a plate having spaced ears, a bolt slidably mounted in the ears of said plate and provided intermediate the ears with an enlargement, a spring extending intermediate the enlargement of the bolt and one of said ears and urging said bolt into engagement with said ratchet rack, a pivoted bell crank, a line connection between one arm of said bell crank and the enlargement of said bolt, and a depressible foot pedal including a stud pivotally connected to the other arm of said bell crank.

In testimony whereof I hereunto affix my signature.

CHARLES E. NORTON.